Dec. 23, 1941.  W. L. L. VIVIE  2,267,058
RADIO RECEIVING APPARATUS
Filed Dec. 15, 1938
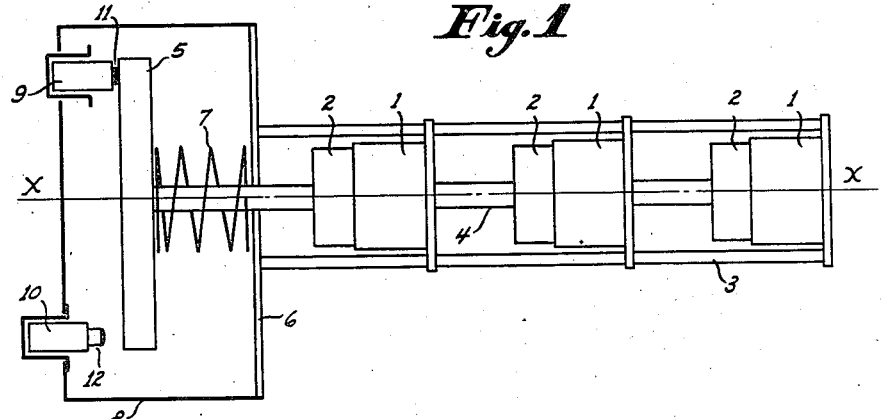
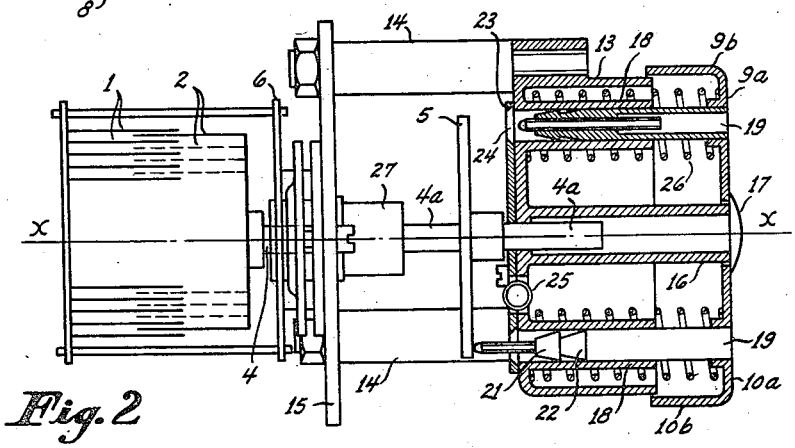
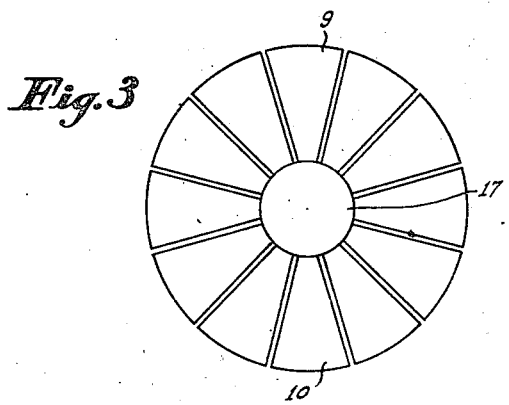
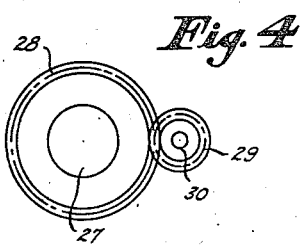
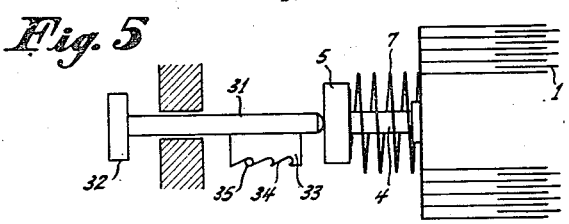
INVENTOR
WILHELMUS L. L. VIVIE
BY
ATTORNEY

UNITED STATES PATENT OFFICE 2,267,058

RADIO RECEIVING APPARATUS

Wilhelmus Lambertus Leonardus Vivie, Eindhoven, Netherlands, assignor, by mesne assignments, to Radio Corporation of America, New York, N. Y., a corporation of Delaware Application December 15, 1938, Serial No. 245,872
In the Netherlands December 24, 1937

3 Claims. (Cl. 74—10)

Radio receiving apparatus having automatic tuning effected by means of one or more operating members such as press buttons are already known. In these apparatus use is made of a condenser of the rotatable electrode type which is controlled by the press buttons either with the intermediary of a transmission mechanism or not. Due to the shape of the condenser plates it is practically impossible to construct these apparatus in such manner that with the aid of such a press button system the apparatus is automatically tuned over a large wave length range, for example, of from 200 to 600 ms. or from 800 to 2000 ms. In one known form of construction it is true that, therefore, the apparatus is equipped with a comparatively large number of press buttons but the wave length ranges which can be switched on with the aid of these buttons are all located within a comparatively small region. It will be evident that an apparatus comprising such a press button system finds little application in practice since the wave length range covered by it is too small.

Owing to the fact that, in accordance with the invention, the tuning condenser is of the slidable-electrode type the conditions become quite different. A very slight relative displacement in axial direction of the movable and the fixed condenser halves results in a great variation in capacity of the apparatus. According to the invention, by using a condenser of the slidable electrode type it is possible to utilize automatic tuning which covers, if desired, the whole of the wave length range of the apparatus without any difficulty, so that if the means required therefor are present in the apparatus, an operating member such as a press button may be provided for each station desired. The dimensions of the tuning condenser, which is formed as a slidable electrode condenser, remain in this case within quite permissible limits, which is not the case if use is made of a condenser of the rotatable electrode type. Since with a slidable electrode condenser it is possible, in the case of permissible dimensions of the condenser, to take a very small ratio between the maximum and minimum capacities, it is possible to construct such a condenser so that without changing over, the whole of the wave length range, i. e. from about 200–2000 ms., can be covered. Since there is in this case no wave length switch, it is consequently possible to distribute the stations to be tuned by the operating members at will over the wave length ranges without being tied down to one determined wave length range.

Automatic tuning may be effected in many ways. According to one advantageous embodiment the position of the slidable electrode condenser is determined, in the case of automatic tuning to a station, by the position of a stop which is coupled with the operating member of the station and which cooperates with a member secured to the shaft of the condenser, automatic tuning being thus brought about completely mechanically. The stops may be adjustable in such manner that owing to the adjustment of the stops a determined operating member may be utilized for each station desired.

In one advantageous embodiment the movable shaft of the condenser has rigidly mounted on it a plate shaped member with which may cooperate a plurality of operating members provided with stops and arranged so as to be parallel to the center line of this shaft. According to the invention, it is advisable that the operating members should be arranged, preferably in one or more concentric circles, around the center line of the movable shaft of the condenser, the whole of the tuning mechanism becoming thus greatly simplified. The construction may, of course, be such that, when the apparatus is tuned to a determined station and consequently a determined operating member such as a button is pressed in, upon passing to another station and consequently upon pressing in another button, the first button automatically returns to its position of rest. If desired, there may also be provided, however, a particular member which restores a pressed in button to its position of rest.

In a further embodiment of the apparatus according to the invention a plurality of stations are operated with the aid of a single operating member which is provided with a plurality of stops and which occupies a different position in the position of each of the stops. The pressing rod of the operating button may be provided, for example, with recesses which are engaged by a pin.

In the apparatus according to the invention it is advisable that the movable shaft of the condenser should always tend, in a manner known per se by the action of a spring, to occupy its neutral position, said shaft being counteracted therein by the stop that has been pressed in. This stop, which is consequently coupled with the operating member in question, is kept by an arresting device in its pressed in position and thus as well as owing to the action of the spring the position of the shaft of the condenser is fixed.

The invention will be explained more fully with reference to the accompanying drawing in which Fig. 1 illustrates an embodiment of the invention wherein several tuning means are operated simultaneously; Fig. 2 illustrates a section through an embodiment of the invention incorporating radially spaced operating levers; Fig. 3 is an end view of the device shown in Fig. 2; Fig. 4 illustrates a detail of the arrangement shown in Fig. 2 pertaining to manual operation; and, Fig. 5 illustrates another form of the invention where a single push button may be used to adjust the tuning means to several positions.

Fig. 1 represents diagrammatically the automatic tuning mechanism present in a radio receiving apparatus, wherein the operating members are formed by press buttons and the tuning condenser is of the slidable electrode type. This condenser is mounted in a casing 3 having arranged in its fixed condenser halves 1 and condenser portions 2 which are axially slidable with respect to the halves 1. The slidable halves 2 are mounted on a continuous shaft 4 which passes through the front wall 6 of the condenser casing, a plate shaped member 5 being provided on said projecting part. Between this member 5 and the wall 6 a helical compression spring 7 is provided around the shaft 4; this spring always tends to remove the plate 5 from the wall 6 and thus to slide the condenser halves out of one another.

The casing 8, which surrounds the plate 5 and the compression spring 7, has mounted in it, in a circle around the center line of the condenser shaft and parallel to said shaft, a plurality of press buttons of which the buttons 9 and 10 are visible in the drawing. At their lower ends the buttons are provided with stops of which the stops 11 and 12 pertaining to the buttons 9 and 10 are shown in the figure. These stops cooperate with the plate 5. In Fig. 1 the button 9 is pressed in, with the result that, upon pressing in, the stop 11 has come into contact with the plate 5. The stop 11 has displaced this plate as well as the shaft 4 and, therefore, also the condenser halves 2 over a certain distance to the right with the result that the tuning condenser has acquired a certain capacity which corresponds to the tuning to a determined station. Owing to the fact that the stops of the different press buttons have different lengths the plate 5 and the shaft 4 are displaced, upon pressing in the button 9, over a distance different from that upon pressing in the button 10. From the figure it may, in fact, be seen that the stop 12 has a length different from that of the stop 11 of the button 9. In Fig. 1 the mechanism by which a button once pressed in is kept in its pressed in position is omitted for the sake of simplicity. Use may be made, of course, of any desired number of buttons. It will be clear that by giving the plate 5 an appropriate shape these buttons may also be arranged in any other manner, for example, in the same manner in which the keys of a typewriter are arranged. If desired, the buttons may also be arranged in a plurality of concentric circles around the axis X—X.

Figs. 2, 3 and 4 represent a system similar to that of Fig. 1, which shows the constructive details. It appears from Fig. 2 that the casing 13 containing the press buttons is secured by means of bolts 14 to a plate 15 which occupies a fixed position with respect to the front-plate 6 of the tuning condenser. In a casing 6 is arranged shaft 4 with movable condenser halves 2 and fixed condenser halves 1 of which only one is shown in Fig. 2. The shaft 4 is provided with an extension 4a which is journalled in a cylindrical bush 16 of the casing 13. The journal 4a is slidable in the bush 16 which is closed by a plate 17. The shaft 4a has mounted on it the plate 5, which is also shown in Fig. 1. In the casing 13 a number of cylindrical bushes 18 are arranged concentrically around the axis X—X, said number corresponding to the number of press buttons with which the apparatus is equipped. It appears from Fig. 3 that there are twelve of them.

The press buttons have a sector shaped portion which is provided with a raised edge. The construction of the buttons 9 and 10 appears from Fig. 2; the segmental portion is formed by 9a and 10a respectively and the raised edge by 9b and 10b respectively. In these buttons are rigidly mounted pressing rods 19 which have an internal screw thread 20 so that the stops 11 and 12 (the only stops which are shown) can be raised and lowered. This consequently affords the possibility of adjusting each press button to any desired station. The pressing rods 19 are provided with two conical parts 21 and 22 which form, with the aid of the groove located between these parts, the mechanism for retaining a button once pressed in until another button is being pressed in. For this purpose a plate 23 is arranged on the bottom of the casing 13 so as to be slightly rotatable about the axis X—X, said plate having holes 24 the number of which corresponds to the number of press buttons. These holes have a circular shape and a slightly conical cross section. Between the bottom of the casing 8 and this plate there are provided a few helical springs 25 by which the plate 23 is always adjusted with respect to the bottom in such manner that the holes in this plate only partially overlap the ends of the channels 18. When one of the press buttons is pressed in, the plate 23 owing to the conical shape of the part 21 and of the aperture 24 in question, is turned against the action of the springs 25 with respect to the bottom of the casing 13 to such an extent that the part 21 can pass through the holes in the casing and in the plate 23, which holes are in line with one another, whilst when the whole of the part 21 has passed through the aperture 24 the plate 23 slightly turns back owing to the action of the springs 25 and retains the pressed in button in the groove between the conical parts 21 and 22, the button being consequently maintained in its pressed in position. When now another button is pressed in, the plate 23 turns again with respect to the bottom of the casing 13 with the result that the button which is pressed in already and on which at the moment no pressure is exerted springs back under the action of the spring 26. If desired, one of the buttons 12 may be formed as a blind key without a stop so that when this button is pressed in the adjustment of the condenser is not altered but only the button that has been pressed in last springs back.

It may be desirable to provide the condenser not only with the above described press button system but also with the manual (consequently not automatic) adjustment which is usually employed in radio receivers. In this case there may be provided on the bush 27 a gear wheel 28 which is in engagement with a pinion 29 mounted on the shaft 30 of the tuning button. This construction is shown in Fig. 4. The bush 27 is mounted by means of a screw thread on the shaft 4 in such manner that a rotation of the bush 27 brings about an axial displacement of the shaft 4.

Fig. 5 represents one embodiment of the apparatus wherein a single button allows of automatically tuning different stations. As in the preceding figures, 1 denotes the condenser casing, 4 denotes the shaft of the condenser and 5 designates the member mounted on the shaft and tending to move to the left under the action of the spring 7. Numeral 31 denotes the pressing rod of a press button 32. This pressing rod is provided on one side with a projecting part 33 which is provided with a plurality of lugs 34 which can each cooperate with a fixed pin 35. Upon pressing in the button 32 one of these lugs comes into contact with the pin 35 which prevents the button 32 from springing back. In some way or other the pin 35 may be brought out of engagement with the lugs 34 so that the button 32 is free to move again. By giving this button 32 different positions it is possible to choose any desired station.

I claim:

1. In radio receiving apparatus provided with an adjustable tuning means of the type wherein adjustments are made by longitudinal displacement, between two extreme positions, of one element of the tuning means within another element thereof different amounts depending upon the tuning adjustment desired, a driving rod connected to the adjustable element of the tuning means, a plate mounted on said driving rod, a plurality of selectively operable means positioned around the driving rod and cooperating with said plate so that upon operation of one of said selectively operable means the adjustable element of the tuning means is moved to a predetermined position.

2. In radio signalling apparatus provided with an adjustable tuning means of the type wherein adjustments are made by the longitudinal displacement of a movable element of the tuning means within another element thereof different amounts depending upon the adjustment desired, the displaceable element being movable to any desired position between two extreme positions, means for applying a substantially constant force to said displaceable element which tends to return the same to one of said extreme positions, a driving rod connected to said displaceable element, a plurality of individually operable means positioned around said driving rod, each of said operable means acting through said driving rod and upon selective operation thereof to effect the movement of said element to respectively different desired positions, and to hold said displaceable element in the desired position, each of said means comprising a member adjustable with respect to said element whereby said different desired positions may be individually and adjustably predetermined.

3. In radio signalling apparatus provided with an adjustable tuning means of the type wherein tuning is accomplished by the displacement of one element of the tuning means within another element thereof, different amounts depending upon the wave length desired, a disc-like element divided into a plurality of selectively operable sectors representing respectively different predetermined positions of said displaceable element within the other element of the tuning means, each of said selectively operable sectors acting upon individual operation thereof to effect the movement of said displaceable element from any position of its adjustment to one of said respectively different predetermined positions and to hold the same in that position against the action of said returning force, and means acting upon operation of another one of said selectively operable sectors to release said displaceable element and to effect its movement to the position represented by said other one of said selectively operable means.

WILHELMUS LAMBERTUS
LEONARDUS VIVIE.